(12) United States Patent
Frank et al.

(10) Patent No.: US 8,719,635 B2
(45) Date of Patent: May 6, 2014

(54) COST EFFECTIVE USE OF SIMULATED STORAGE IN A STORAGE SUBSYSTEM TEST ENVIRONMENT

(75) Inventors: Denis A. Frank, Winchester (GB); Payal Mehta, Woking (GB); David A. Sinclair, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 13/345,403

(22) Filed: Jan. 6, 2012

(65) Prior Publication Data

US 2013/0179733 A1    Jul. 11, 2013

(51) Int. Cl.
G06F 11/22    (2006.01)
G06F 11/26    (2006.01)

(52) U.S. Cl.
USPC ............................. 714/25; 714/5.11; 714/27

(58) Field of Classification Search
USPC ....................................... 714/5.11, 25, 27, 42
See application file for complete search history.

(56) References Cited

U.S. PATENT DOCUMENTS

| | | | | |
|---|---|---|---|---|
| 7,430,154 | B2 * | 9/2008 | Pratt et al. | 369/30.27 |
| 7,467,333 | B2 * | 12/2008 | Keeton et al. | 714/41 |
| 7,552,044 | B2 | 6/2009 | Xu et al. | |
| 2005/0071125 | A1 | 3/2005 | Groz | |
| 2008/0022155 | A1 * | 1/2008 | Wack | 714/40 |
| 2008/0294943 | A1 * | 11/2008 | Hsieh et al. | 714/42 |
| 2009/0044253 | A1 * | 2/2009 | Interlandi et al. | 726/4 |
| 2009/0271415 | A1 | 10/2009 | Galgali et al. | |
| 2009/0276202 | A1 | 11/2009 | Susarla et al. | |
| 2009/0281782 | A1 | 11/2009 | Bitar et al. | |
| 2010/0312540 | A1 | 12/2010 | Jess | |

OTHER PUBLICATIONS

Microsoft Developer Network, Common Scenario Stress with IO, http://msdn.microsoft.com/en-us/library/dd450391.aspx, Dec. 10, 2009.
Netapp hammer: Disk & Storage Controller Stress Testing Tool, linux—storage—virtualization, http://unixfoo.blogspot.com/2008/12/netapp-hammer-disk-storage-controller.html, Dec. 1, 2008.
Arumilli, Kishor, "Storage Simulator," web article, Wipro Technologies, Retrieved from Search Report, Sep. 30, 2011.
Sanblaze Technology, Inc., "Storage Emulation," website www.sanblaze.com, Sep. 29, 2011.
Routray, Ramani, Gopisetty, Sandeep, Galgali, Pallavi, Modi, Amit and Nadgowda, Shripad, "iSAN: Storage Area Network Management Modeling Simulation," Jul. 2007.
Wang, Yijian and Kaeli, David, "Execution-driven Simulation of Network Storage Systems," Proceedings of the The IEEE Computer Society's 12th Annual International Symposium on Modeling, Analysis, and Simulation of Computer andTelecommunications Systems, 2004.

* cited by examiner

*Primary Examiner* — Joseph Schell (74) *Attorney, Agent, or Firm* — Kunzler Law Group (57) ABSTRACT

A data receiver module receives, at a storage device simulator, a data transmission from a storage controller being tested. The data transmission includes data and metadata. The metadata is associated with the data. A signature receiver module receives a signature from the storage controller as part of the data transmission. The signature is used to distinguish the metadata from the data. A data/metadata determination module examines the data transmission and determines data from metadata using the signature. A metadata storage module stores the metadata of the data transmission on the storage device simulator in response to the data transmission including metadata. The data storage simulator includes a data storage device. A data discard module discards the data of the data transmission in response to the data transmission including data.

26 Claims, 9 Drawing Sheets

| bit→<br>↓byte | 7 | 6 | 5 | 4 | 3 | 2 | 1 | 0 |
|---|---|---|---|---|---|---|---|---|
| 0 | Operation code = 28h ||||||||
| 1 | | LUN || | DPO | FUA | Reserved || RelAdr |
| 2-5 | LBA ||||||||
| 6 | Reserved ||||||||
| 7-8 | Transfer length ||||||||
| 9 | Control ||||||||

COST EFFECTIVE USE OF SIMULATED STORAGE IN A STORAGE SUBSYSTEM TEST ENVIRONMENT

FIELD

The subject matter disclosed herein relates to data storage and more particularly relates to simulated data storage for testing a storage controller.

BACKGROUND

Description of the Related Art

When a storage system is developed, the system is typically tested to determine if any problems exist. Typically the system under test includes a storage controller that receives storage requests and instructions from a test host. The storage controller is connected to one or more storage devices. The storage controller typically has a limit on the amount of data storage that the storage controller may control. The limit may be expressed in gigabytes, terabytes, petabytes, etc. To properly test the storage controller, a storage device load matching the capacity of the storage controller is desirable.

Providing a storage device load made up of actual storage devices may be very expensive, so simulated storage devices may be used. Simulated storage devices are able to simulate receiving and storing data without using a full array of actual storage devices that matches a storage controller's capacity. However, simulated storage devices have limitations because the simulated storage devices lack the actual storage capacity of an array of actual storage devices.

BRIEF SUMMARY

A method for simulated data storage connected to a storage controller under test is disclosed. The simulated data storage distinguishes between metadata and data received as part of a data transmission based on a signature transmitted as part of the data transmission, so that metadata may be stored and data may be discarded. An apparatus and system also perform the functions of the method.

A method for simulated data storage connected to a storage controller under test includes receiving, at a storage device simulator, a data transmission from a storage controller being tested. The data transmission includes data and/or metadata. The metadata is associated with the data. The method includes receiving a signature from the storage controller as part of the data transmission. The method uses the signature to distinguish the metadata from the data. The method includes examining the data transmission and determining data from metadata using the signature. The method also includes storing the metadata of the data transmission on the storage device simulator in response to the data transmission including metadata. The data storage simulator includes a data storage device. The method includes discarding the data of the data transmission in response to the data transmission including data.

In one embodiment, the data includes the signature, and determining data from metadata includes recognizing that at least a portion of the data transmission with the signature includes data and/or recognizing that at least a portion of the data transmission without the signature includes metadata. In a further embodiment, substantially all of the data is made up of the signature. In another further embodiment, the method also includes returning requested metadata in response to a read request directed to metadata, and returning simulated data in response to a read request for data. In another embodiment, the simulated data includes the signature. In yet another embodiment, the method includes generating the simulated data prior to returning the simulated data as part of a response to a read request.

In one embodiment, the metadata includes the signature and determining data from metadata includes recognizing that at least a portion of the data transmission with the signature includes metadata and/or recognizing that at least a portion of the data transmission without the signature includes data. In a further embodiment, the metadata comprises a header for the data and the signature is located in the header. In another embodiment, determining data from metadata includes receiving a command with the data transmission, and wherein the command includes the signature. In another embodiment, the command is a storage command with a reserved field and the signature is written into the reserved field. For example, the command may include a SCSI Read 10 command. In another embodiment, the command is transmitted over a channel different from a channel transmitting the data to the storage device simulator.

In one embodiment, the data transmission includes a block storage request and the method also includes storing a logical block address ("LBA") with the metadata of the data transmission, where the LBA is associated with the data transmission. In another embodiment, the data storage simulator stores the metadata at a location on the storage device different than an LBA transmitted with the data transmission. The LBA comprises a portion of a block storage request associated with the data transmission. In another embodiment, the signature includes an LBA and determining data from metadata includes determining that an LBA associated with a data transmission is a location where metadata is stored or a location where data is stored.

A method for deploying a computer program product is provided. The method includes integrating computer readable program code into a computing system, where the code in combination with the computing system performs the steps of the method described above.

An apparatus for simulated data storage connected to a storage controller under test includes a data receiver module, a signature receiver module, a data/metadata determination module, a metadata storage module, and a data discard module. The data receiver module receives, at a storage device simulator, a data transmission from a storage controller being tested. The data transmission includes data and metadata. The metadata is associated with the data. The signature receiver module receives a signature from the storage controller as part of the data transmission. The signature is used to distinguish the metadata from the data.

The data/metadata determination module examines the data transmission and determines data from metadata using the signature. The metadata storage module stores the metadata of the data transmission on the storage device simulator in response to the data transmission including metadata. The data storage simulator includes a data storage device. The data discard module discards the data of the data transmission in response to the data transmission including data.

In one embodiment, the data includes the signature and the data/metadata determination module determines data from metadata by recognizing that at least a portion of the data transmission with the signature includes data and/or recognizing that at least a portion of the data transmission without the signature includes metadata. In another embodiment, the apparatus includes a read module that returns requested metadata in response to a read request directed to metadata and that returns simulated data in response to a read request directed to data. In a further embodiment, the apparatus includes a simulated data module that generates the simulated data prior to the read module returning the simulated data.

In another embodiment, the metadata includes the signature and the data/metadata determination module determines data from metadata by recognizing that at least a portion of the data transmission with the signature includes metadata and/or recognizing that at least a portion of the data transmission without the signature includes data. In another embodiment, the data/metadata determination module determines data from metadata by receiving a command with the data transmission, where the command includes the signature.

A system is included for simulated data storage connected to a storage controller under test. The system includes a data storage device and a storage device simulator that controls data storage on the data storage device. The storage device simulator is in communication with a storage controller being tested. In one embodiment, the storage device simulator includes a data receiver module, a signature receiver module, a data/metadata determination module, a metadata storage module, and a data discard module. The data receiver module receives, at a storage device simulator, a data transmission from a storage controller being tested. The data transmission includes data and metadata. The metadata is associated with the data. The signature receiver module receives a signature from the storage controller as part of the data transmission. The signature is used to distinguish the metadata from the data.

The data/metadata determination module examines the data transmission and determines data from metadata using the signature. The metadata storage module stores the metadata of the data transmission on the storage device simulator in response to the data transmission including metadata. The data storage simulator includes a data storage device. The data discard module discards the data of the data transmission in response to the data transmission including data.

In one embodiment, the system includes a test host. The test host transmits data to the storage controller. The data transmission includes data from the test host. In another embodiment, a communication protocol for communication between the test host and the storage controller includes Network File System ("NFS") or Common Internet File System ("CIFS"). In another embodiment, the test host generates data, where the data includes the signature. In another embodiment, the system includes a storage area network ("SAN") connecting the storage device simulator with the storage controller.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
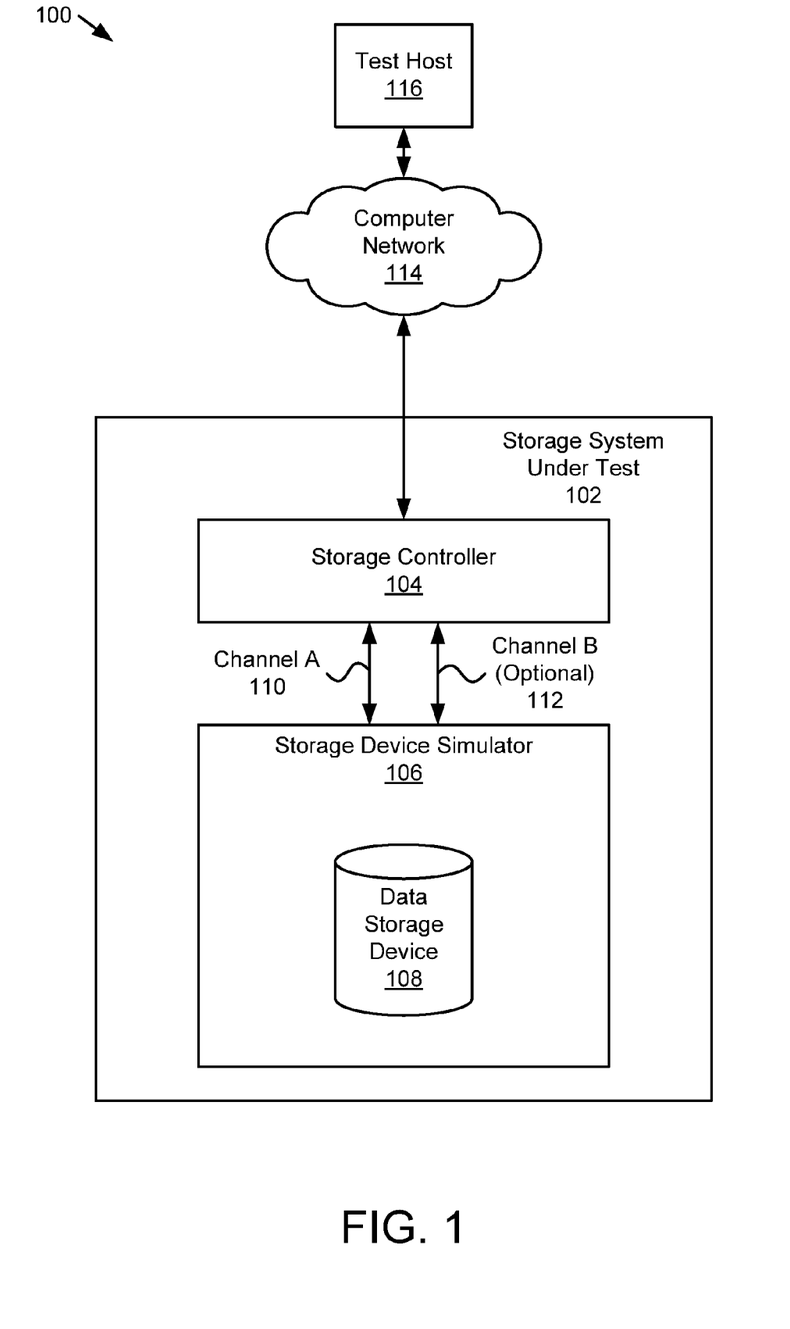
FIG. 1 is a schematic block diagram illustrating one embodiment of a system for simulating data storage in accordance with the present invention.

FIG. 1 is a schematic block diagram illustrating one embodiment of a system 100 for simulating data storage in accordance with the present invention. The system 100 includes a storage system under test 102, a storage controller 104, a storage device simulator 106, a data storage device 108, Channel A 110, Channel B 112, a computer network 114, and a test host 116, which are described below.

The storage system under test 102, in one embodiment, includes a storage controller 104 being tested and a storage device simulator 106. Other embodiments may include two or more storage controllers 104 being tested and/or two or more storage device simulators 106. The storage device simulator 106 includes one or more data storage devices 108. The one or more data storage devices 108, in one embodiment, have a combined data storage capacity that is less than the maximum data storage capacity that can be controlled by the storage controller 104 under test. Hereinafter, the term "data storage device 108" may refer to a single data storage device or multiple data storage devices. Having actual data storage in the storage device simulator 106 allows some data to be stored. Having an amount of data storage in the storage device simulator 106 that is less than the maximum allowable storage capacity of the storage controller 104 may provide a substantial cost savings over a system with a full array of data storage devices matching the maximum storage capacity of the storage controller 104 under test.

The storage system under test 102 depicts one embodiment with a Channel A 110 and a Channel B 112 connecting the storage controller 104 and the storage device simulator 106. In another embodiment, the storage controller 104 and the storage device simulator 106 are connected with a single channel (i.e. Channel A 110). Other embodiments may include more than two channels.

In one embodiment, the storage device simulator 106 is connected to the storage controller 104 using a system bus, such as a peripheral component interconnect express ("PCI-e") bus, a Serial Advanced Technology Attachment ("serial ATA") bus, or the like. In another embodiment, the storage device simulator 106 is connected to the storage controller 104 using a universal serial bus ("USB") connection, an Institute of Electrical and Electronics Engineers ("IEEE") 1394 bus ("FireWire"), or the like. In other embodiments, the storage device simulator 106 is connected to the storage controller 104 using a peripheral component interconnect ("PCI") express bus using external electrical or optical bus extension or bus networking solution such as Infiniband or PCI Express Advanced Switching ("PCIe-AS"), or the like. One of skill in the art will recognize other types of connections between the storage device simulator 106 and the storage controller 104.

The storage device simulator 106 controls data storage on the data storage device 108. In one embodiment, the storage device simulator 106 stores data on the data storage device 108 in a location different than commanded by the storage controller 104. The storage device simulator 106 may include a mapping between an address where the storage controller 104 indicates that data/metadata is to be stored and where the storage device simulator 106 stores the data. This indirection may allow the storage device simulator 106 to more efficiently use storage capacity of the data storage device 108.

In one embodiment, the system 100 includes one or more test hosts 116 connected to the storage controller 104 through one or more computer networks 114. A test host 116 may be a host, a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. The computer network 114 may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. The computer network 114 may also include a network from the IEEE 802 family of network technologies, such Ethernet, token ring, WiFi, WiMax, and the like.

The computer network 114 may include servers, switches, routers, cabling, radios, and other equipment used to facilitate networking storage systems under test 102 and test hosts 116. In one embodiment, the system 100 includes systems under test 102 that communicate as peers over a computer network 114. One of skill in the art will recognize other computer networks 114 comprising one or more computer networks 114 and related equipment with single or redundant connection between one or more test hosts 116 or other computer with one or more storage systems under test 102.

In one embodiment, the test host 116 is connected to the storage controller 104 directly. For example, the test host 116 may simulate a network connection. In other embodiments, the test host 116 is connected to the storage controller 104 using a USB connection, FireWire, PCI, PCIe, or other connection. One of skill in the art will recognize other connection types between the test host 116 and the storage controller 104.

Figure 2:
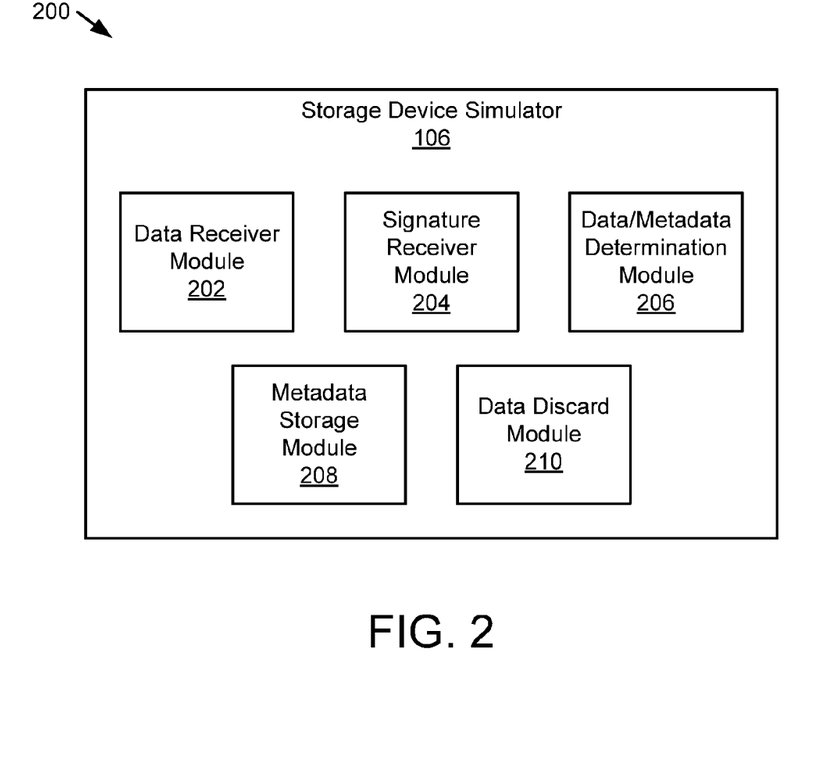
FIG. 2 is a schematic block diagram illustrating one embodiment of an apparatus for simulating data storage in accordance with the present invention.

FIG. 2 is a schematic block diagram illustrating one embodiment of an apparatus 200 for simulating data storage in accordance with the present invention. The apparatus 200, in one embodiment, includes a storage device simulator 106 with a data receiver module 202, a signature receiver module 204, a data/metadata determination module 206, a metadata storage module 208, and a data discard module 210, which are described below. While the modules 202-210 are depicted in the storage device simulator 106, all or a portion of the modules 202-210 may be located elsewhere.

The apparatus 200, in one embodiment, includes a data receiver module 202 that receives, at the storage device simulator 106, a data transmission from the storage controller 104 being tested. In one embodiment, the data transmission includes data or metadata or both. Typically, the metadata is associated with the data. Typically, metadata includes information about the data, such as information about a file or object associated with the data, a data type, information about a data structure associated with the data, timestamp information, etc. In one embodiment, the metadata is part of a header for the data. In one embodiment the header includes the signature. In one example, the header is transmitted with the data as part of the data transmission and the signature is used to determine where the header ends and the data begins.

Typically the data transmission from the storage controller 104 includes a command to store data, metadata, or both. In some embodiments, data and metadata about the data are sent together in the data transmission. In other embodiments, the data transmission includes data but no metadata or metadata but no data. In some embodiments, even though data is sent separately from metadata, the data transmission may include metadata associated with the data storage command.

The command to store data/metadata may be a small computer system interface ("SCSI") command and may include a block storage request with a logical block address ("LBA") and offset that indicates a length of the data/metadata. In another embodiment, the command to store data/metadata may include an address within a particular data storage device with which the storage controller 104 is programmed to be attached. The command to store data/metadata may be in a cylinder-head-sector ("CHS") format, an extended cylinder-head-sector ("ECHS") format, a zone bit recording format, or other format appropriate for the storage controller 104 to communicate a location that data is to be stored on the storage device simulator 106.

In another embodiment, the storage device simulator 106 emulates sequential storage or a log storage device and the command to store data/metadata includes a command to store data/metadata at a current append point and the storage device simulator 106 will then return an address where the data/metadata was to be stored. One of skill in the art will recognize other addressing formats and information transmitted with a command to store data on the storage device simulator 106.

The data transmission may include a command and data/metadata or may include a command and the data/metadata is sent separately. The data transmission, in one embodiment, originates with at the test host 116. In another embodiment, data is sent from the test host 116 in the form of a file, object, etc. and the storage controller 104 creates data/metadata suitable for storage on a storage device and sends one or more data transmissions to the storage device simulator 106. In one embodiment, the test host 116 includes a file system and manages the storage system under test 102 as a data storage device 108 and sends block storage commands with LBAs and offsets to the storage controller 104.

In another embodiment, the storage controller 104 receives files, objects, or other logical structures and manages storage as a file system. In yet another embodiment, the storage test host 116 includes a file system and the storage controller 104 includes another file system. For example, the storage controller 104 may emulate a block storage device and may be capable of receiving files, objects, block storage requests, or other logical structure. In the example, the storage controller 104 may be a log storage device, sequential storage device, or the like and may include some level of indirect mapping to map object identifiers, file names, logical block addresses, etc. with addresses where the storage device simulator 106 is to store the data/metadata.

In another embodiment, the data transmission may be part of a direct memory access ("DMA") or remote DMA ("RDMA") request and a command to the storage controller 104 may allow the storage controller to directly access data at a storage device available to the test host 116 or other computer. While data/metadata associated with the data transmission or data/metadata of the data transmission may originate in various locations, in one embodiment, the data transmission received by the storage device simulator 106 is received directly from the storage controller 104. One of skill in the art will recognize other forms and origins of a data transmission with data and/or metadata received at the storage device simulator 106.

The apparatus 200, in one embodiment, includes a signature receiver module 204 that receives a signature from the storage controller 104 as part of the data transmission. The signature distinguishes the metadata from the data. The apparatus 200, in another embodiment, includes a data/metadata determination module 206 that examines the data transmission and determines data from metadata using the signature. The signature may take multiple forms in various embodiments. In one embodiment, the signature is part of the data. In another embodiment, the signature is part of the metadata. In yet another embodiment, the signature is part of a command associated with the data transmission. For example, data/metadata may be transmitted on Channel A 110 while a command with the signature is transmitted on Channel B 112.

The signature includes a string of characters recognized by the data/determination module 206. For example, the signature may be one or more bytes of data coded in a specific way to be recognized by the data/metadata determination module 206. In one embodiment, the signature is small but is placed in the metadata or data in a specific location so that the signature will not be mistaken for data that has the same bit combination. In another embodiment, the signature is large enough so that the likelihood that the signature will be naturally found in the data is small. In another embodiment, the signature comprises a hash of at least a portion of the data and/or metadata. One of skill in the art will recognize other forms for a signature that may be used to distinguish data from metadata.

In one embodiment, for each data storage request on Channel A 110, a corresponding request on Channel B 112 indicates whether the data storage request on Channel A 110 is data or metadata. In a related embodiment, the signature may be used to signal data or metadata. The data/metadata determination module 206 may receive a communication over Channel B 112 and may determine if the corresponding data transmission over Channel A 110 includes data or metadata. In one embodiment, a SCSI Read 10 command or similar command may be used and is discussed further in relation to FIG. 6.

In one embodiment, metadata of the data transmission includes the signature and the data/metadata determination module 206 determines that a portion of the data transmission with the signature is metadata and that a portion of the data transmission without the signature is data. For example, the metadata may be of a specific form or length and the data/metadata determination module 206 may determine that a specific portion of the data transmission is metadata if the portion includes the signature, and may then identify how much of the data transmission is metadata based on the known format or length. In another embodiment, data and metadata are sent in separate data transmissions and the data/metadata determination module 206 determines that a data transmission is metadata if the data transmission includes the signature and determines that a data transmission is data if the data transmission does not include the signature.

In embodiments where metadata includes the signature, the metadata typically includes the signature plus other metadata. For example, the signature may be in a specific field or location within the metadata such that the data/metadata determination module 206 may look at the specific field or location. In another embodiment, the signature is a bit in a bitmap and the bit being a one or a zero indicates if the data transmission is data or metadata. In another embodiment, presence of the signature may signal to the data/metadata determination module 206 that a portion of the data transmission is metadata. In a further embodiment, once the data/metadata determination module 206 determines that the signature is present in the data transmission, particular coding of the signature or specific information within the signature may then identify the data and/or metadata to be of a specific type or from a specific source.

In one embodiment, an LBA is recognized as a signature to distinguish data from metadata. The LBA may be part of a logical block storage request. For example, if an LBA indicates an address within a particular range corresponding to where metadata is stored, data associated with the LBA may be recognized as metadata and may be stored by the metadata storage module 208. In another embodiment, if an LBA indicates an address within a range associated with storing data, data associated with the LBA may be discarded by the data discard module 210. One of skill in the art may recognize other ways that an LBA may be used as a signature.

The apparatus 200 includes, in one embodiment, a metadata storage module 208 that stores the metadata of the data transmission on the storage device simulator 106 in response to the data transmission including metadata. In another embodiment, the apparatus 200 includes a data discard module 210 that discards the data of the data transmission in response to the data transmission having data. Because the metadata includes information about the data and some of the metadata may be generated by the storage controller 104 under test, storing and then retrieving the metadata may be more desirable in testing the storage controller 104 than contents of the data. Typically, the data may be arbitrary and as long as what was stored matches what is retrieved, the data may be anything. Therefore, the data may be discarded by the data discard module 210, and then regenerated as required when the data is read.

In one example, if the data transmission includes data and metadata, the data/metadata determination module 206 detects the signature in part of the data transmission and distinguishes between data and metadata. The metadata storage module 208 stores the portion of the data transmission with metadata on the data storage device 108 and the data discard module 210 discards the portion of the data transmission with data. In another embodiment, if the data transmission includes metadata and not data, the data/metadata determination module 206 detects the signature in the metadata and the metadata storage module 208 stores the metadata. In another embodiment, if the data transmission includes data, the data discard module 210 discards the data.

In one embodiment, the signature may be added to the metadata by the test host 116. In another embodiment, the signature may be added to the metadata by the storage controller 104. In an instance where the signature is found in data, in one embodiment the metadata storage module 208 may store data mistakenly as metadata. This possibility is reduced as the signature becomes longer, is in a particular location, is more complex, etc.

The metadata storage module 208, in one embodiment, may store metadata on the data storage device 108 in a location matching where the storage controller 104 directed the metadata to be stored. In another embodiment, the metadata storage module 208 stores the metadata in a location different than directed by the storage controller 104 and tracks where the metadata is stored for later retrieval. The metadata storage module 208 may include a mapping that matches a location where the storage controller 104 directed the storage device simulator 106 to store the metadata to a location on the data storage device 108 where the metadata storage module 208 actually stored the metadata.

In another embodiment, the signature is stored with the data and the metadata does not intentionally include the signature. In one example, the data is substantially made up of the signature that is repeated throughout the data. In this example, the test host 116 may generate the data by repeating the signature. In this embodiment, the data/metadata determination module 206 may determine that a repeating pattern of the signature is data. Where the repeating pattern of the signature is found in data transmission, the data discard module 210 discards the data with the repeated signature. Where the data/metadata determination module 206 does not find the signature in the data transmission, the data/metadata determination module 206 determines that this data without the signature is metadata and the metadata storage module 208 stores the metadata on the data storage device 108.

In various embodiments, the data/metadata determination module 206 may mark a portion of the data transmission metadata and another portion data, may note a position of the data and metadata in the data transmission, may separate metadata from data, etc. The data/metadata determination module 206 may communicate to the metadata storage module 208 and to the data discard module 210 a location of the metadata and data, a division between data and metadata within the data transmission, or any other means known to one of skill in the art so that the metadata storage module 208 may store metadata of the data transmission and the data discard module 210 may discard data of the data transmission.

In another embodiment, the storage device simulator 106 stores a portion of the data while the data discard module 210 discards other data. For example, the signature maybe included with metadata and with data so that both are stored. In this example, the metadata storage module 208 may store metadata that includes the signature on the data storage device 108, and the storage device simulator 106 or other module may store data with the signature on the data storage device 108. In another embodiment, the signature is coded to signal to the storage device simulator 106 to store both data and metadata. One of skill in the art will recognize other ways to signal the storage device simulator 106 or other modules to store both data and metadata.

Figure 3:
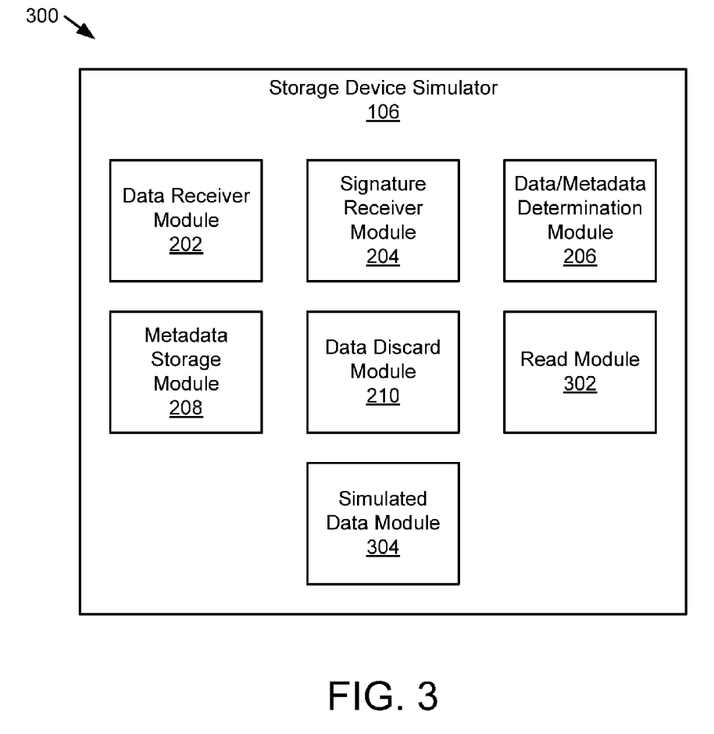
FIG. 3 is a schematic block diagram illustrating an alternate embodiment of an apparatus for simulating data storage in accordance with the present invention.

FIG. 3 is a schematic block diagram illustrating an alternate embodiment of an apparatus 300 for simulating data storage in accordance with the present invention. The apparatus 300 includes a storage device simulator 106 with a data receiver module 202, a signature receiver module 204, a data/metadata determination module 206, a metadata storage module 208, and a data discard module 210, which are substantially similar to those described in relation to the apparatus 200 of FIG. 2. In addition, the apparatus 300 includes a read module 302 and a simulated data module 304, which are described below.

In one embodiment, the apparatus 300 includes a read module 302 that returns requested metadata in response to a read request directed to metadata. In another embodiment, the read module 302 returns simulated data in response to a read request directed to data. In another embodiment, the read module 302 returns both metadata and data in response to a read request. In yet another embodiment, the apparatus 300 includes a simulated data module 304 that generates the simulated data prior to the read module returning the simulated data. The simulated data may, in one embodiment, include the signature.

Typically, read requests come from the storage controller 104. In various embodiments, read requests may originate in a storage controller 104 connected to the storage device simulator 106, from the test host 116, or from another device connected to the storage system under test 102. Typically, when a storage controller 104 is being tested the storage controller 104 issues read requests to a storage device to be able to test a read capability. In addition, one test may be for a storage controller 104 to store data and then to read the data that was stored. Where data is discarded by the data discard module 210, it may be desirable for the storage device simulator 106 to provide simulated data in response to a read request that requests data.

In one embodiment, simulated data generated by the simulated data module 304 matches or substantially matches data that was discarded by the storage device simulator 106. For example, where the metadata storage module 208 stores metadata of a data transmission and the data discard module 210 discards data of the data stream, the storage controller 104 may issue a read request to read the data and metadata of the data transmission. The read module 302 may return metadata and data to the storage controller 104. The data returned by the read module 302 may match or substantially the discarded data. One way to have the data match the discarded data is for the discarded data to be of a known pattern and for the simulated data module 304 to recreate the discarded data using the known pattern.

In one embodiment the known pattern is the signature. For example, the discarded data may be a repeating pattern of the signature. In another embodiment, the test host 116 creates the data and the storage controller 104 passes the data to the simulated storage device 106 for storage. The simulated data module 304 may then generate simulated data that again is a repeat of the signature and the read module 302 then returns the simulated data.

In another embodiment, the simulated data module 304 returns data that does not match discarded data. For example, the simulated data from the simulated data module 304 may match a size of discarded data but may differ from the discarded data. In another embodiment, the amount of discarded data does not match simulated data generated by the simulated data module 304 and returned by the read module 302. One of skill in the art will recognize other forms of data returned by the read module 302 in response to a read request and other ways that the simulated data module 304 may generate data.

Figure 4:
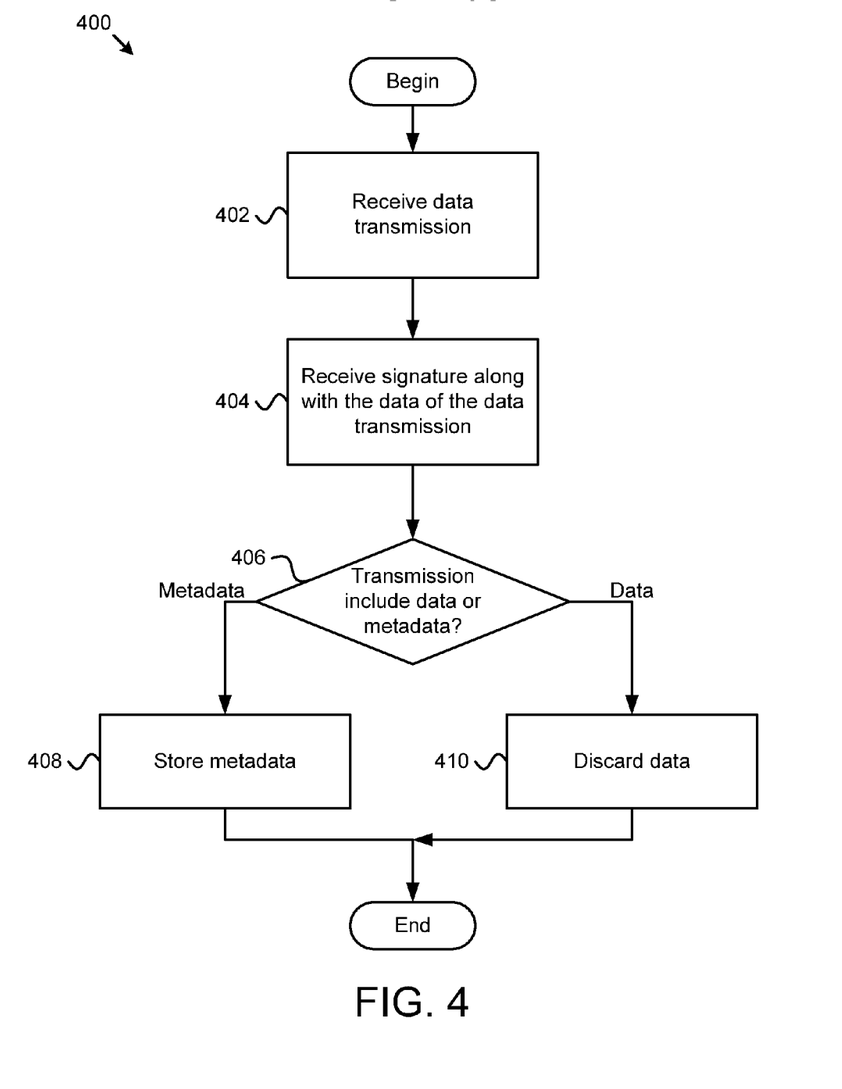
FIG. 4 is a schematic flow chart diagram illustrating one embodiment of a method for simulating data storage in accordance with the present invention.

FIG. 4 is a schematic flow chart diagram illustrating one embodiment of a method 400 for simulating data storage in accordance with the present invention. The method 400 begins and the data receiver module 202 receives 402 a data transmission from a storage controller 104 under test. The data transmission may include data and/or metadata. The signature receiver module 204 receives 404 a signature from the storage controller 104 as part of the data transmission. The signature is situated in the data transmission so that data may be distinguished from metadata. In one embodiment, the signature is received as part of a command from the storage controller 104. In one example, the command is received with the data transmission over Channel A 110. In another embodiment, the command is received over Channel B 112 while data and/or metadata is received over Channel A 110.

In another embodiment, the signature is part of the metadata of the data transmission and any data that may be part of the data transmission does not include the signature. The signature may be in a particular location or field of the metadata. In another embodiment, the signature is part of data of the data transmission while any metadata that may be part of the data transmission does not include the signature. For example, the data may be a repeating pattern of the signature or a repeating pattern of data that includes the signature.

The data/metadata determination module 206 examines the data transmission and determines 406 data from metadata using the signature associated with the data transmission. The data/metadata determination module 206, may note a location of data and/or metadata in the data transmission, may separate data from metadata, or may otherwise distinguish data from metadata. If the data/metadata determination module 206 determines 406 that the data transmission includes metadata, the metadata storage module 208 stores 408 the metadata of the data transmission on the data storage device 108 of the storage device simulator 106. If the data/metadata determination module 206 determines 406 that the data transmission includes data, the data discard module 210 discards 410 data of the data transmission. Once the metadata storage module 208 has stored 408 data and/or the data discard module 210 has discarded data, the method 400 ends.

Figure 5:
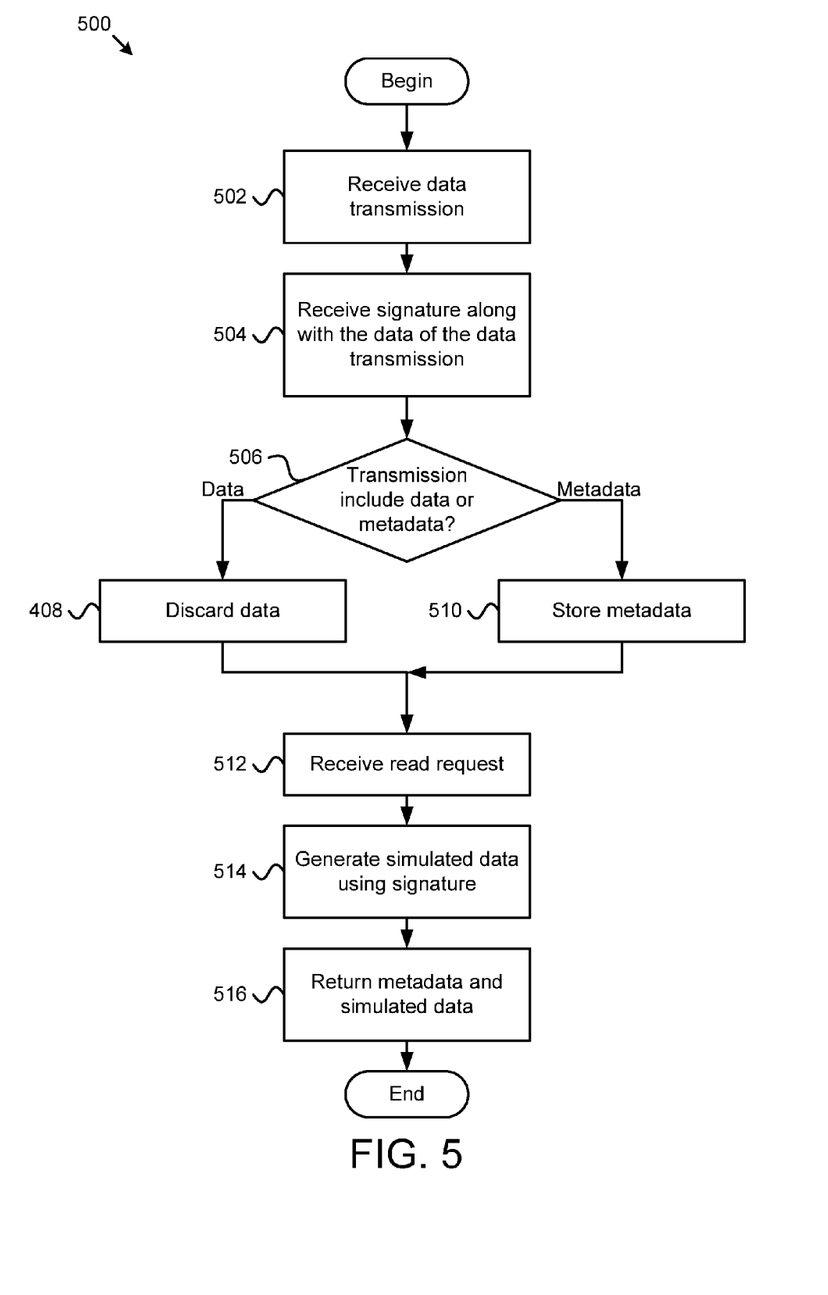
FIG. 5 is a schematic flow chart diagram illustrating an alternate embodiment of a method for simulating data storage in accordance with the present invention.

FIG. 5 is a schematic flow chart diagram illustrating an alternate embodiment of a method 500 for simulating data storage in accordance with the present invention. The method 500 begins and the data receiver module 202 receives 502 a data transmission from a storage controller 104 under test. The data transmission may include data and/or metadata. The signature receiver module 204 receives 504 a signature from the storage controller 104 as part of the data transmission.

The data/metadata determination module 206 examines the data transmission and determines 506 data from metadata using the signature associated with the data transmission. If the data/metadata determination module 206 determines 506 that the data transmission includes metadata, the metadata storage module 208 stores 508 the metadata of the data transmission on the data storage device 108 of the storage device simulator 106. If the data/metadata determination module 206 determines 506 that the data transmission includes data, the data discard module 210 discards 510 data of the data transmission.

In one embodiment, the storage device simulator 106 receives 512 a read request from the storage controller 104. Where the read request includes a request to read data, in one embodiment the simulated data module 304 generates 514 simulated data using the signature. For example, the simulated data module 304 may generate 514 simulated data by including the signature in a repeating pattern. In one embodiment, the simulated data module 304 creates simulated data that matches data discarded by the data discard module 210. For example, the test host 116 may generate data using the signature that is then discarded 508 by the data discard module 210 and then the simulated data module 304 generates 514 simulated data that matches the data generated by the test host 116. The read module 302 returns 516 requested metadata in response to a read request directed to metadata and returns 516 simulated data in response to a read request directed to data, and the method 500 ends.

Figure 6:
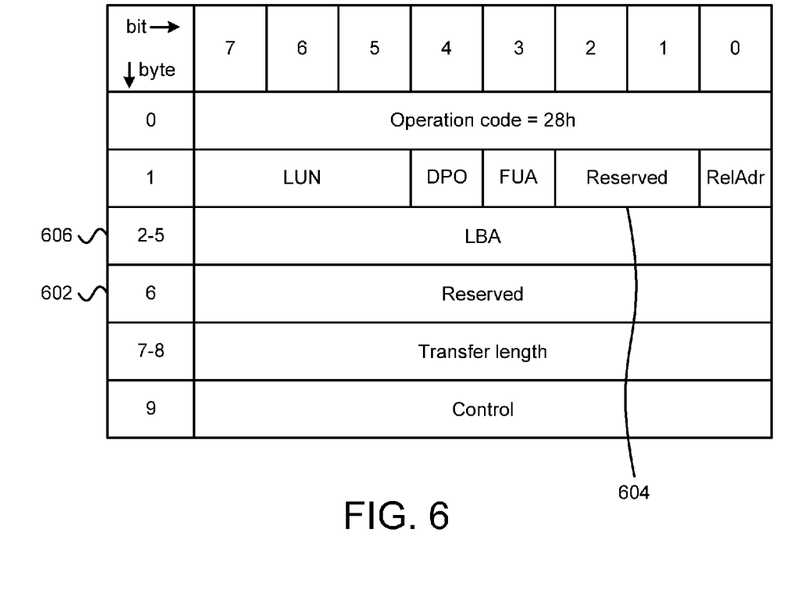
FIG. 6 is a diagram illustrating one embodiment of a command descriptor block structure for SCSI Read 10 command.

FIG. 6 is a diagram illustrating one embodiment of a command descriptor block structure for SCSI Read 10 command. As mentioned in relation to FIG. 2, in one embodiment the signature may be incorporated in a SCSI Read 10 command. For example, the signature may be included in the reserved field of the 6$^{th}$ byte 602. In one embodiment, if the reserved field 602 includes the signature, data that is being read may be metadata. In a related embodiment, if the reserved field 602 includes a different signature, or if the reserved field is blank, data that is being read may be data instead of metadata. In another example, one or both of the 1 and 2 bits of the first byte 604 are set to 1 or 0 to indicate that data being read is either metadata or data. In various embodiments, a signature in a reserved field of a command may include an indication of a location of metadata within a data transmission that was stored previously.

In other embodiments, other commands, such as a SCSI Read 12 or a SCSI Read 32 command may be used to incorporate a signature. In various embodiments, commands such as a SCSI Write 10, a SCSI Write 12, or a SCSI Write 32 command may be used and a reserved field may be again used to include or not include a signature to indicate metadata or data. In another embodiment, the SCSI commands or other commands are received over a Channel B 112 while data is transmitted over a Channel A 110 of the storage system under test 102. In one embodiment, the LBA 606 may be used as a signature. For example the LBA may be used to indicate where data is stored and where metadata is stored. If a SCSI command, such as a SCSI Write 12 command includes an LBA that is within a range of addresses where metadata is to be stored, data of the data transmission may be recognized as metadata. One of skill in the art will recognize other ways to use a signature with a command to distinguish between data and metadata of a data transmission.

Figure 7A:
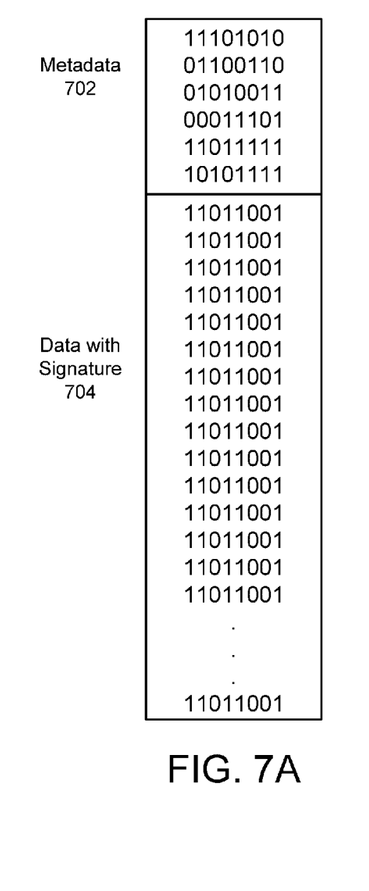
FIG. 7A is a diagram illustrating a simplified representation of metadata and data where the data includes a signature.

FIG. 7A is a diagram illustrating a simplified representation of metadata and data where the data includes a signature. In the embodiment, a first portion of a data transmission includes metadata 702 and a second portion includes data with the signature 704. The data/metadata determination module 206 may examine the data stream and may then determine where the data begins by determining when the signature is detected. In one embodiment, a data transmission may include just the metadata 702 while another data transmission includes just data with the signature 704.

Figure 7B:
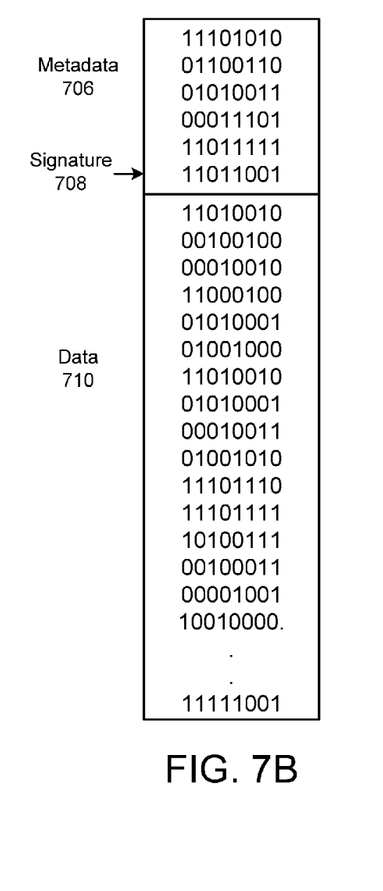
FIG. 7B is a diagram illustrating a simplified representation of metadata and data where the metadata includes a signature.

FIG. 7B is a diagram illustrating a simplified representation of metadata and data where the metadata includes a signature. FIG. 7B depicts a data stream with metadata 706 and the metadata 706 includes a signature 708. The data stream also includes data 710 that does not include the signature. Typically, where the metadata 706 includes the signature, the metadata 706 will include other information in addition to the signature 708 so that when the metadata storage module 208 stores the metadata on the data storage device 108, a subsequent read will return the metadata 706 and the metadata may be examined to determine if the storage controller 104 stored the metadata correctly.

Note that the diagrams in FIGS. 7A and 7B are simplified to illustrate use of a signature and an actual data transmission may include many more bits per byte and more metadata 702 than is shown. In addition, other elements may be included in the data stream, such as an end-of-file marker. One of skill in the art will recognize other ways to incorporate a signature in data or metadata.

Figure 8A:
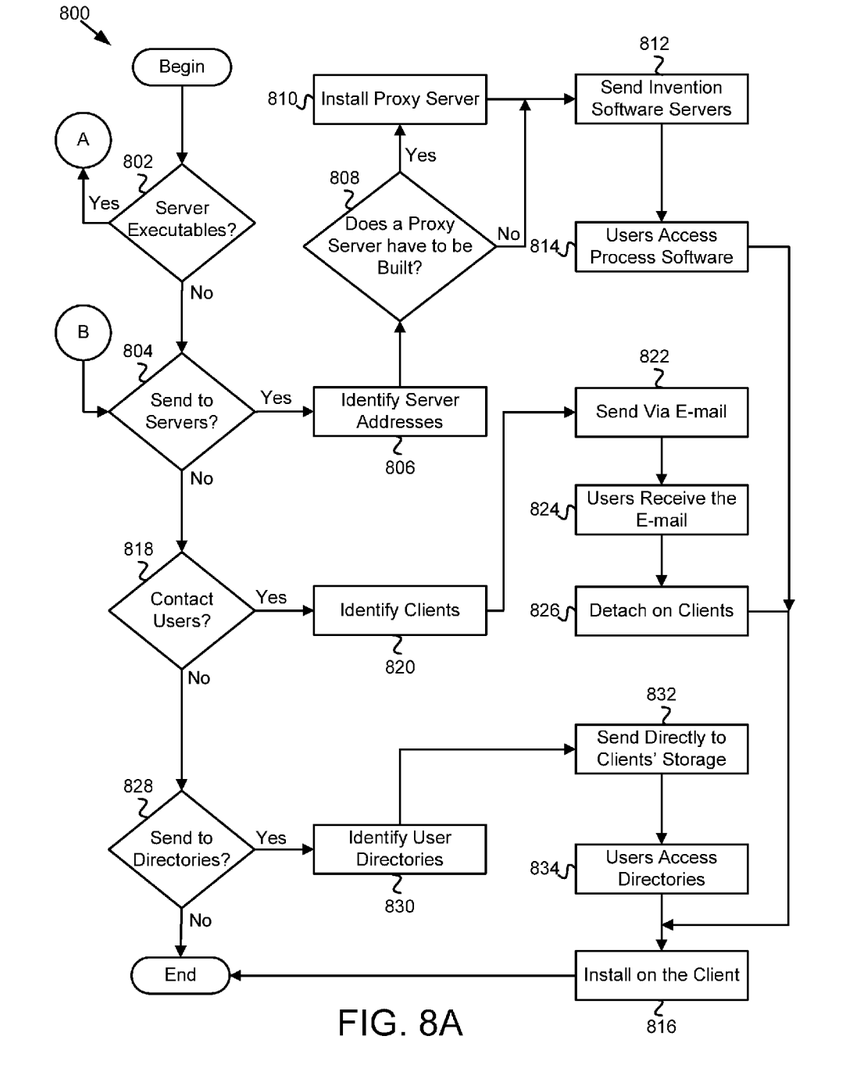
FIG. 8A is a schematic flow chart diagram illustrating one embodiment of a method for deploying an apparatus for a storage device simulator in accordance with the present invention.
Figure 8B:
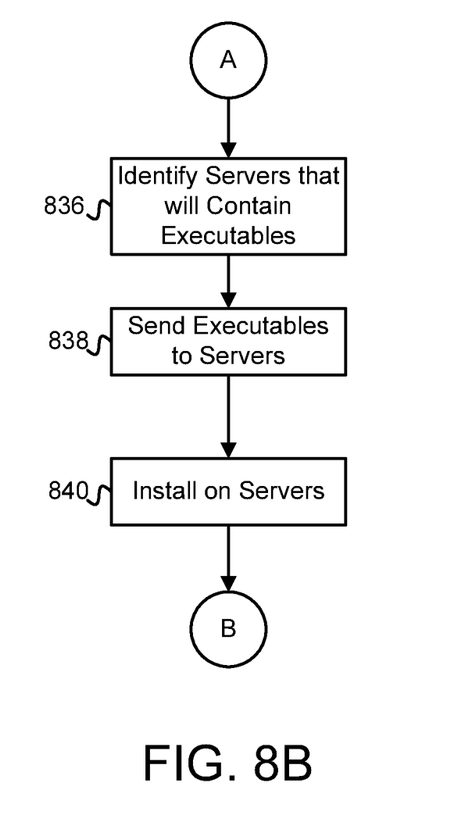
FIG. 8B is a continuation of FIG. 8A illustrating one embodiment of a method for deploying and apparatus for the storage device simulator in accordance with the present invention.

FIG. 8A is a schematic flow chart diagram illustrating one embodiment of a method 800 for deploying an apparatus 200, 300 in a storage device simulator 106 in accordance with the present invention. FIG. 8B is a continuation of FIG. 8A. While it is understood that the process software for an apparatus 200, 300 in a storage device simulator 106 may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software.

Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will select the proxy server code, determine on which computers to place the proxy servers' code, transmit the proxy server code, then install the proxy server code on the proxy computer. The process software will be transmitted to the proxy server and then it will be stored on the proxy server.

The method 800 for deployment of an apparatus 200, 300 that is part of a storage device simulator 106 begins and a determination 802 is made if there are any programs that will reside on a server or servers when the process software is executed. If this is the case, referring to FIG. 8B, the servers that will contain the executables are identified 836. The process software for the server or servers is transferred 838 directly to the servers' storage via FTP or some other protocol or by copying through the use of a shared file system. The process software is then installed 840 on the servers.

Next, referring back to FIG. 8A, a determination 804 is made on whether the process software is be deployed by having users access the process software on a server or servers. If the users are to access the process software on servers then the server addresses that will store the process software are identified 806. A determination 808 is made if a proxy server is to be built to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 810.

The process software is sent 812 to the servers either via a protocol such as FTP or it is copied directly from the source files to the server files via file sharing. Another embodiment would be to send a transaction to the servers that contained the process software and have the server process the transaction, then receive and copy the process software to the server's file system. Once the process software is stored at the servers, the users, via their client computers, then access 814 the process software on the servers and copy to their client computers file systems. Another embodiment is to have the servers automatically copy the process software to each client and then run the installation program for the process software at each client computer. The user executes the program that installs 816 the process software on his client computer then the method 800 ends.

In step 818, a determination is made whether the process software is to be deployed by sending the process software to users via e-mail. The set of users where the process software will be deployed are identified 820 together with the addresses of the user client computers. The process software is sent via e-mail to each of the users' client computers. The users then receive the e-mail 824 and then detach 826 the process software from the e-mail to a directory on their client computers. The user executes the program that installs 816 the process software on his client computer then the method 800 ends.

Lastly a determination 828 is made on whether to the process software will be sent directly to user directories on their client computers. If so, the user directories are identified 830. The process software is transferred 832 directly to the user's client computer directory. This can be done in several ways such as but not limited to sharing of the file system directories and then copying from the sender's file system to the recipient user's file system or alternatively using a transfer protocol such as File Transfer Protocol (FTP). The users access 834 the directories on their client file systems in preparation for installing the process software. The user executes the program that installs the process software on his client computer 816 then the method 800 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving, at a storage device simulator, a data transmission from a storage controller being tested, the data transmission comprising one or more of data and metadata, the metadata associated with the data;
   receiving a signature from the storage controller as part of the data transmission, the signature distinguishing the metadata from the data;
   examining the data transmission and determining data from metadata using the signature;
   storing the metadata of the data transmission on the storage device simulator in response to the data transmission comprising metadata, the data storage simulator comprising a data storage device; and
   discarding the data of the data transmission in response to the data transmission comprising data.

2. The method of claim 1, wherein the data comprises the signature and wherein determining data from metadata comprises one or more of
   recognizing that at least a portion of the data transmission with the signature comprises data; and
   recognizing that at least a portion of the data transmission without the signature comprises metadata.

3. The method of claim 2, wherein substantially all of the data is made up of the signature.

4. The method of claim 2, further returning requested metadata in response to a read request directed to metadata and returning simulated data in response to a read request for data.

5. The method of claim 4, further comprising generating the simulated data prior to returning the simulated data.

6. The method of claim 1, wherein the metadata comprises the signature and wherein determining data from metadata comprises one or more of
   recognizing that at least a portion of the data transmission with the signature comprises metadata; and
   recognizing that at least a portion of the data transmission without the signature comprises data.

7. The method of claim 6, wherein the metadata comprises a header for the data and the signature is located in the header.

8. The method of claim 1, wherein determining data from metadata comprises receiving a command with the data transmission, and wherein the command comprises the signature.

9. The method of claim 8, wherein the command comprises a storage command with a reserved field and wherein the signature is written into the reserved field.

10. The method of claim 9, wherein the command comprises a SCSI Read 10 command.

11. The method of claim 8, wherein the command is transmitted over a channel different from a channel transmitting the data to the storage device simulator.

12. The method of claim 1, wherein the data transmission comprises a block storage request and further comprising storing a logical block address ("LBA") with the metadata of the data transmission, the LBA associated with the data transmission.

13. The method of claim 1, wherein the data storage simulator stores the metadata at a location on the storage device different than an LBA transmitted with the data transmission, the LBA comprising a portion of a block storage request associated with the data transmission.

14. The method of claim 1, wherein the signature comprises an LBA and wherein determining data from metadata comprises determining that an LBA associated with a data transmission is one of:
   a location where metadata is stored; and
   a location where data is stored.

15. An apparatus comprising:
   a data receiver module that receives, at a storage device simulator, a data transmission from a storage controller being tested, the data transmission comprising data and metadata, the metadata associated with the data;
   a signature receiver module that receives a signature from the storage controller as part of the data transmission, the signature distinguishing the metadata from the data;
   a data/metadata determination module that examines the data transmission and determines data from metadata using the signature;
   a metadata storage module that stores the metadata of the data transmission on the storage device simulator in response to the data transmission comprising metadata, the data storage simulator comprising a data storage device; and
   a data discard module that discards the data of the data transmission in response to the data transmission comprising data;

wherein each module is one or more of logic hardware and executable code, the executable code being stored on a non-transitory computer-readable storage media.

16. The apparatus of claim 15, wherein the data comprises the signature and wherein the data/metadata determination module determines data from metadata by one or more of
recognizing that at least a portion of the data transmission with the signature comprises data; and
recognizing that at least a portion of the data transmission without the signature comprises metadata.

17. The apparatus of claim 15, further comprising a read module that returns requested metadata in response to a read request directed to metadata and that returns simulated data in response to a read request directed to data.

18. The apparatus of claim 17, further comprising a simulated data module that generates the simulated data prior to the read module returning the simulated data.

19. The apparatus of claim 15, wherein the metadata comprises the signature and wherein the data/metadata determination module determines data from metadata by one or more of
recognizing that at least a portion of the data transmission with the signature comprises metadata; and
recognizing that at least a portion of the data transmission without the signature comprises data.

20. The apparatus of claim 15, wherein the data/metadata determination module determines data from metadata by receiving a command with the data transmission, wherein the command comprises the signature.

21. A method for one deploying a computer program product, the method comprising:
integrating computer readable program code into a computing system, wherein the code in combination with the computing system performs the following:
receiving, at a storage device simulator, a data transmission from a storage controller being tested, the data transmission comprising one or more of data and metadata, the metadata associated with the data;
receiving a signature from the storage controller as part of the data transmission, the signature distinguishing the metadata from the data;
examining the data transmission and determining data from metadata using the signature;
storing the metadata of the data transmission on the storage device simulator in response to the data transmission comprising metadata, the data storage simulator comprising a data storage device; and
discarding the data of the data transmission in response to the data transmission comprising data.

22. A system comprising:
a data storage device;
a storage device simulator that controls data storage on the data storage device, the storage device simulator in communication with a storage controller being tested, the storage device simulator comprising:
a data receiver module that receives, at the storage device simulator, a data transmission from a storage controller being tested, the data transmission comprising data and metadata, the metadata associated with the data;
a signature receiver module that receives a signature from the storage controller as part of the data transmission, the signature distinguishing the metadata from the data;
a data/metadata determination module that examines the data transmission and determines data from metadata using the signature;
a metadata storage module that stores the metadata of the data transmission on the storage device in response to the data transmission comprising metadata; and
a data discard module that discards the data of the data transmission in response to the data transmission comprising data.

23. The system of claim 22, further comprising a test host, the test host transmitting data to the storage controller, the data transmission comprising data from the test host.

24. The system of claim 23, wherein a communication protocol for communication between the test host and the storage controller comprises one of Network File System ("NFS") and Common Internet File System ("CIFS").

25. The system of claim 23, wherein the test host generates data, the data comprising the signature.

26. The system of claim 22, further comprising a storage area network ("SAN") connecting the storage device simulator with the storage controller.

* * * * *